United States Patent [19]
Slater et al.

[11] Patent Number: 6,003,474
[45] Date of Patent: Dec. 21, 1999

[54] LEASH-TENSION-CONTROLLED STIMULUS-PRODUCING DOG COLLAR AND METHOD

[75] Inventors: Robert E. Slater, Tucson, Ariz.; Ralph L. Pelton, Sulphur Springs, Tex.; Timothy T. Duncan; Robert D. Rozanski, both of Tucson, Ariz.

[73] Assignee: Tri-Tronics, Inc., Tucson, Ariz.

[21] Appl. No.: 09/173,261

[22] Filed: Oct. 14, 1998

Related U.S. Application Data

[60] Provisional application No. 60/095,799, Aug. 7, 1998.

[51] Int. Cl.$^6$ ..................................................... A01K 27/00
[52] U.S. Cl. ......................... 119/859; 119/792; 119/795; 119/908
[58] Field of Search ..................................... 119/859, 792, 119/795, 797, 798, 908; 340/573

[56] References Cited

U.S. PATENT DOCUMENTS

| | | |
|---|---|---|
| 452,571 | 5/1891 | Holson . |
| 470,155 | 3/1892 | Holson . |
| 2,023,950 | 12/1935 | Carter ........................................ 175/311 |
| 3,319,605 | 5/1967 | Early et al. . |
| 3,874,339 | 4/1975 | Coulbourn ............................. 119/792 |
| 4,681,303 | 7/1987 | Grassano ................................ 267/113 |
| 4,794,402 | 12/1988 | Gonda et al. ........................... 232/895 |
| 4,802,482 | 2/1989 | Gonda et al. ........................... 128/419 |
| 4,947,795 | 8/1990 | Farkas . |
| 5,054,428 | 10/1991 | Farkas . |
| 5,494,002 | 2/1996 | Greene .................................... 119/719 |

FOREIGN PATENT DOCUMENTS

| | | |
|---|---|---|
| 3300486 | 7/1984 | Germany . |
| 8004998 | 4/1982 | Netherlands . |

*Primary Examiner*—Thomas Price
*Assistant Examiner*—James S. Bergin
*Attorney, Agent, or Firm*—Cahill, Sutton & Thomas P.L.C.

[57] ABSTRACT

A leash training device includes a leash cord (3) and a stimulus collar (4,6) coupled to an end of the leash cord. The stimulus collar includes a strap (4) adapted to fit around the neck of an animal to be trained or controlled, and an electrical stimulus unit (6) supported by the strap. The electrical stimulus unit (6) includes a stimulus circuit (16). A transformer (17) coupled between the stimulus circuit (16) and a pair of electrodes (5) for contacting skin of the animal. A measurement device (101) is coupled to the leash cord to measure tension in the leash cord and produce a control signal (106) when the tension exceeds a predetermined threshold. The stimulus circuit (16) produces a drive signal in response to the control signal and applies the drive signal to a primary winding of the transformer (17). The measurement device (101) includes a first connector (103) connected to the second end of the leash cord (3) and to a first end of a spring (34) having a second end coupled in a fixed relationship to a second connector (102) so that the spring (34) resists movement of the second connector (102) relative to the first connector (103).

9 Claims, 9 Drawing Sheets

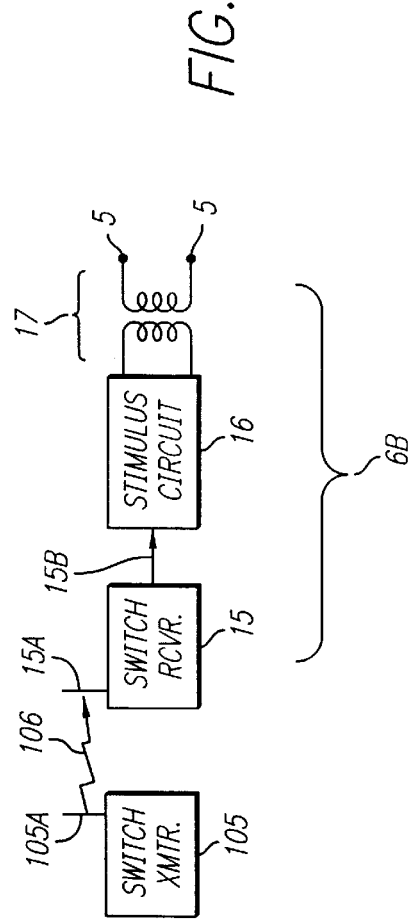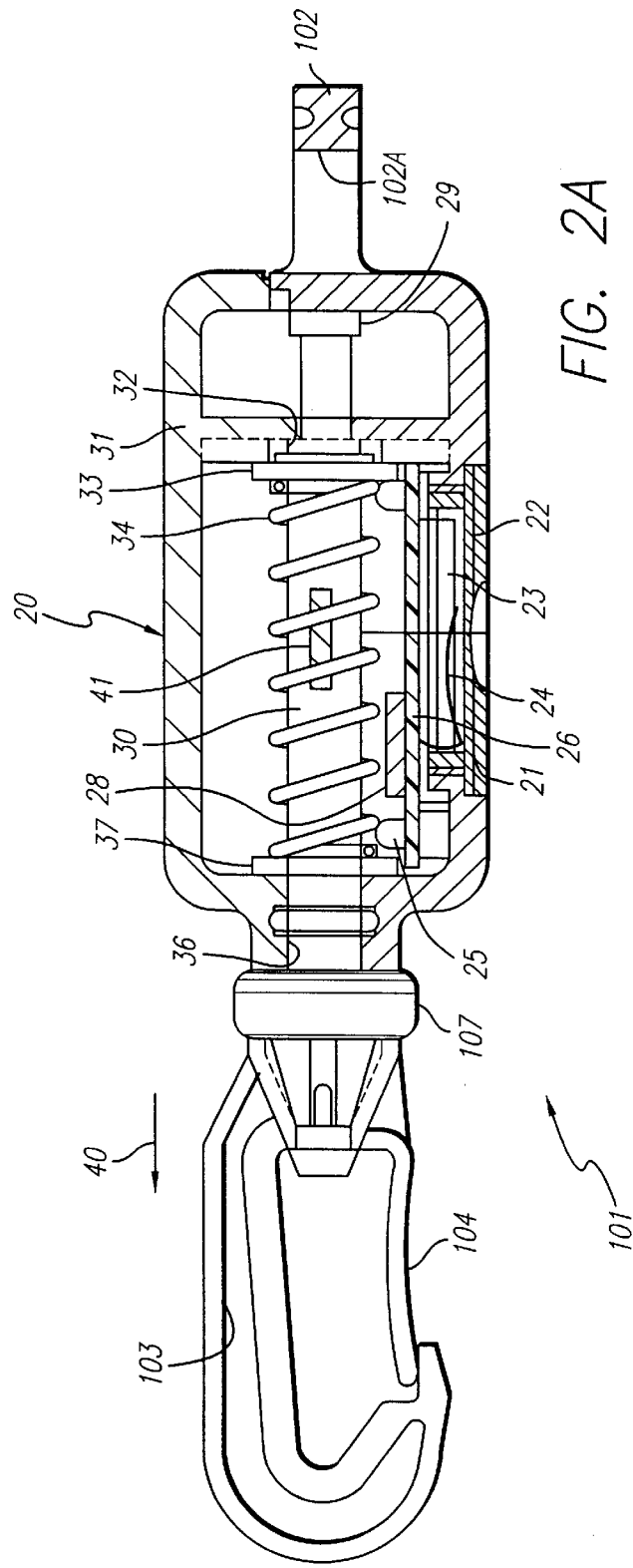

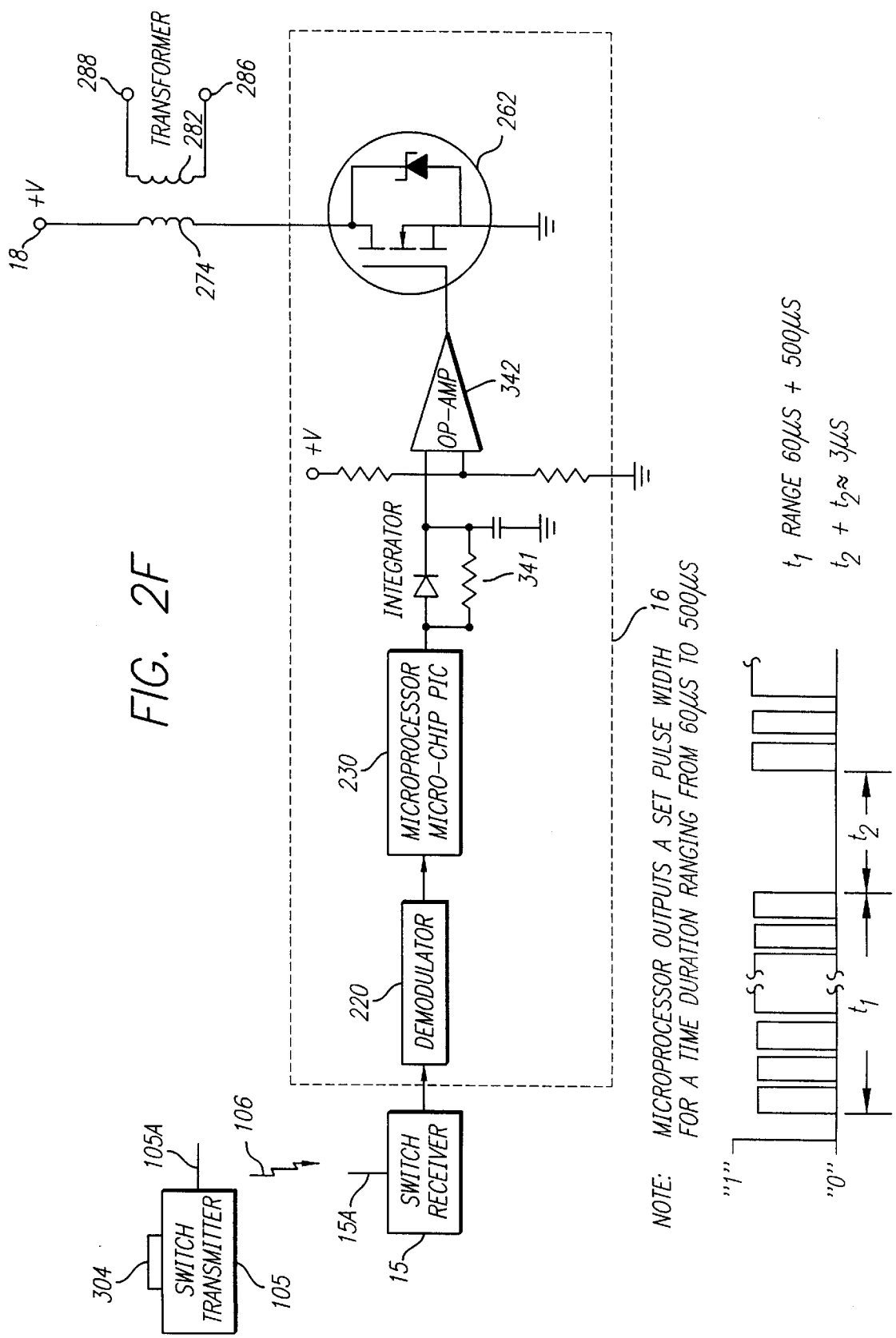

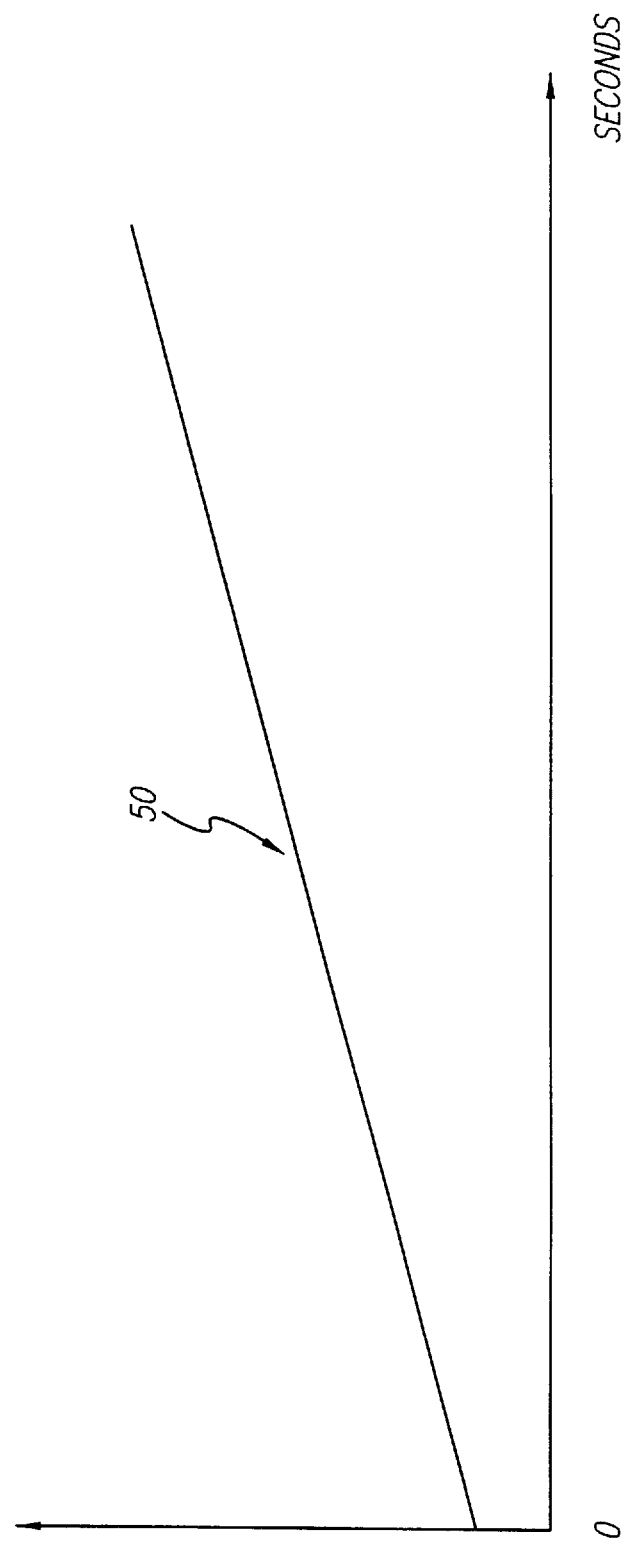

LEASH-TENSION-CONTROLLED STIMULUS-PRODUCING DOG COLLAR AND METHOD

CROSS REFERENCE TO RELATED APPLICATION

This application claims the benefit of commonly owned U.S. provisional application Ser. No. 60/095,799, filed Aug. 7, 1998, entitled "LEASH-TENSION-CONTROLLED STIMULUS-PRODUCING DOG COLLAR AND METHOD", naming Robert E. Slater, Roy L. Pelton, Timothy T. Duncan and Robert D. Rozanski as contributors.

BACKGROUND OF THE INVENTION

The invention relates to a device for use in conjunction with an animal leash to train the animal to refrain from straining against the leash.

By way of background, humane use of electroshock stimulus apparatus mounted on dog collars, primarily for remote controlled training of dogs by means of remote transmitters, has become widely accepted by humane societies in the United States. Commonly assigned U.S. Pat. Nos. 4,794,402 and 4,802,482 illustrate the state of the art for remote controlled electrical stimulus training collars. U.S. Pat. No. 4,947,795 discloses a "bark control" electrical stimulus collar which is not actuated by RF signals received from a remote transmitter, but instead is activated by the sound of a dog's own barking; this product is used to automatically train a dog to avoid nuisance barking.

A problem which has not yet been effectively addressed by use of electrical stimulus in the field of dog training is disruptive pulling against a leash, especially by a large, rambunctious dog. For example, a large rambunctious dog being "walked" by a small person might cause the person to stumble or even suddenly pull the person into traffic. U.S. Pat. No. 2,023,950 discloses a leash and collar for a dog including electrodes which are connected by an automotive spark coil; a push button on a battery pack connected to the primary winding of the spark coil is actuated to produce "a slight electric shock" to catch the dog's attention. The purpose is to teach the dog to associate a particular command or sound with a slight shock and to teach the dog that if it gives proper attention to the command or sound it will receive no shock. German patent document DE 003300486 discloses a dog leash and collar including a piezoelectric ignition element activated by leash tension. U.S. Pat. No. 5,494,002 discloses a device coupled between a leash and a collar so that tensioning of the leash actuates a trigger which then actuates an electrically powered sound generator to discourage the animal from excessive tensioning of the leash. A device marketed as the WONDER WHISTLE by KII Enterprises of Camillus, N.Y. and another device advertised as the HAPPY WALKER both produce sounds which are emitted when a dog strains excessively against a leash.

None of these prior art leash devices produce electrical stimulation of the type described in the assignee's above-mentioned patents to effectively train dogs (or other animals) to consistently avoid undesired behaviors.

Commonly assigned U.S. Pat. No. 4,802,482, issued Feb. 7, 1989 by Gonda et al. entitled "METHOD AND APPARATUS FOR REMOTE CONTROL OF ANIMAL TRAINING STIMULUS", U.S. Pat. No. 4,947,795, issued Aug. 14, 1990 by Gregory J. Farkas entitled "BARKING CONTROL DEVICE AND METHOD", U.S. Pat. No. 5,054,428, issued Oct. 8, 1991 by Gregory J. Farkas entitled "METHOD AND APPARATUS FOR REMOTE CONDITIONED CUE CONTROL OF ANIMAL TRAINING STIMULUS", and U.S. Pat. No. 4,794,402 issued Dec. 27, 1988 by Gonda et al. entitled "ANTENNA FOR ANIMAL TRAINING RECEIVER UNIT MOUNTED BENEATH COLLAR" all are incorporated herein by reference.

There is an unmet need for an inexpensive, effective training apparatus that enables a person to easily and safely walk and automatically control and train an animal, especially a large, rambunctious dog, to avoid disruptive pulling on the leash.

It also would be desirable for professional dog trainers to have an electronic stimulus device which provides stimulation similar to that of the previously mentioned commonly assigned patents but adapted for training wherein the trainer is very close to and in physical contact with the dog, for example, when training the dog to "heel", roll over, etc. whereby a remote transmitter is not needed to provide commands to the stimulus unit.

SUMMARY OF THE INVENTION

Accordingly, it is an object of the invention to provide an apparatus and method which provides effective electrical stimulation to discourage the animal from excessive straining against a leash.

It is another object of the invention to provide an apparatus and method to produce electrical stimulation in response to excessive leash tension so as to discourage a dog from excessive straining against the leash.

It is another object of the invention to provide leash-tension-responsive apparatus and method for use by a trainer to produce suitable electrical stimulation to aid in training a dog that is very close to and in physical contact with the trainer.

It is another object of the invention to provide an inexpensive, reliable leash control device which avoids breakage of conductors between a tensioning element and a collar mounted stimulus control unit.

Briefly described, and in accordance with one embodiment thereof, the invention provides a leash training device including a leash cord, and a handle attached to a first end of the leash cord, a stimulus collar coupled to a second end of the leash cord. The stimulus collar includes a strap adapted to fit around the neck of an animal to be trained or controlled, and an electrical stimulus unit supported by the strap. The electrical stimulus unit includes a stimulus circuit (16), and a transformer coupled between the stimulus circuit and a pair of electrodes (5) for contracting skin of the animal. A measurement device (101) is coupled to the leash cord for measuring tension in the leash cord and producing a control signal when the tension exceeds a predetermined threshold. The stimulus circuit produces a drive signal in response to the control signal and applies the drive signal to a primary winding of the transformer The strap includes a connecting ring and the measurement device includes a first connector connected to the connecting ring and a second connector connected to the second end of a leash cord. The measurement device also includes a spring having a moveable first end connected to the first connector and a second end coupled in a fixed relationship to a second connector. The measurement device also includes a switch device operable in response to movement of the first connector relative to the second connector. In one embodiment, the measurement device produces the control signal for as long as the tension exceeds the predetermined threshold. In one embodiment, the stimulus collar includes a switch receiver circuit, and the measurement device includes a switch transmitter which generates the control signal as a wireless RF signal in response to the movement of the second connector relative to the first connector sufficient to cause the tension to exceed the predetermined threshold.

BRIEF DESCRIPTION OF THE DRAWINGS

FIG. 1B is a block diagram showing a switch transmitter and antenna contained in a tension measuring element shown in FIG. 1A and a switch receiver and stimulus circuit contained in the stimulus unit of FIG. 1A.

FIG. 2A is a section view of one embodiment of a tension detecting element in FIG. 1A.

FIGS. 2E and 2F are block diagrams of alternate embodiments of circuitry for effectuating control of the amplitudes of stimulus voltage pulses produced by the embodiment of FIG. 2D.

FIG. 6 is a graph useful in explaining the amount of effective stimulation produced under program control by the stimulus unit as a function of time measured from the onset of excessive straining against the leash and/or amount of leash tension.

DETAILED DESCRIPTION OF THE PREFERRED EMBODIMENTS

Figure 1A:
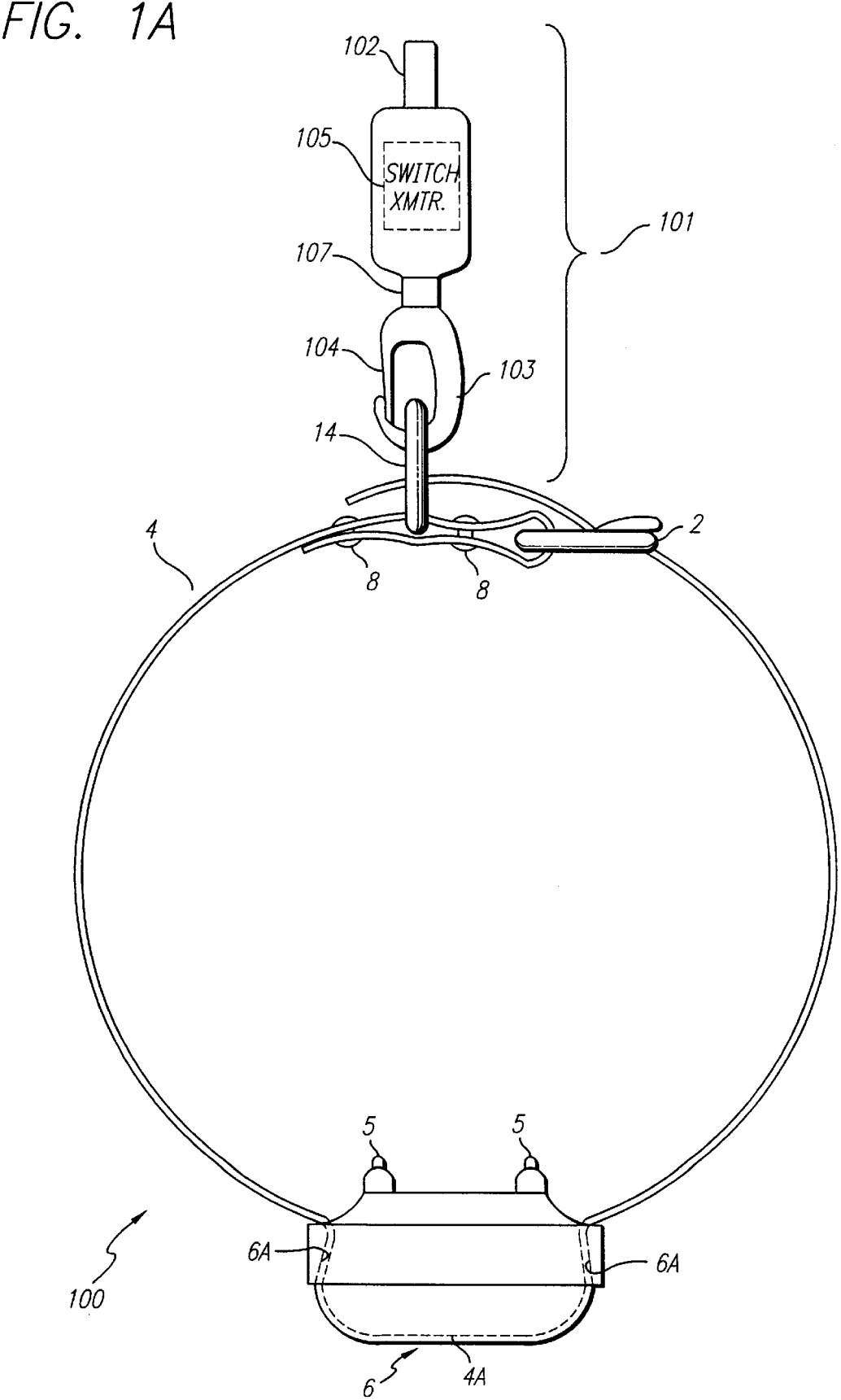
FIG. 1A is a diagram of a preferred embodiment of the present invention.

Referring to FIG. 1A, leash training system 100 includes an electrical stimulus unit 6 contained within a housing that is supported by a collar strap 4. Strap 4 passes through two slots 6A in the housing and extends beneath the bottom of the electrical stimulus unit 6 as indicated by dotted line 4A. A folded-back portion of one end of strap 4 is fastened by a pair of rivets 8 to define two loops. A conventional buckle 2 extends through a first one of the loops, and can be buckled to the opposite end of strap 4. A leash ring 14 attached to collar strap 4 at a location diagonally opposed to electrical stimulus unit 6 extends through the second loop, as illustrated.

Electrical stimulus unit 6 includes electrical circuitry 6B shown in FIG. 1B, wherein a conventional switch receiver circuit 15 receives an RF signal 106 that is detected by an antenna 15A. Switch receiver circuit 15 produces a control signal 15B which is input to a stimulus circuit 16. Stimulus circuit 16 is coupled to the primary winding of a transformer 17. The circuitry in stimulus circuit 16 can be identical to or similar to any of the stimulus circuits disclosed in any of the above-identified commonly assigned U.S. Pat. Nos. 4,794, 402, 4,802,482, 4,947,795 and 5,054,428. The secondary winding of transformer 17 is connected to electrodes 5, which extend above insulating portions of the upper surface of the electrical stimulus unit 6 supported by strap 4.

Figure 2B:
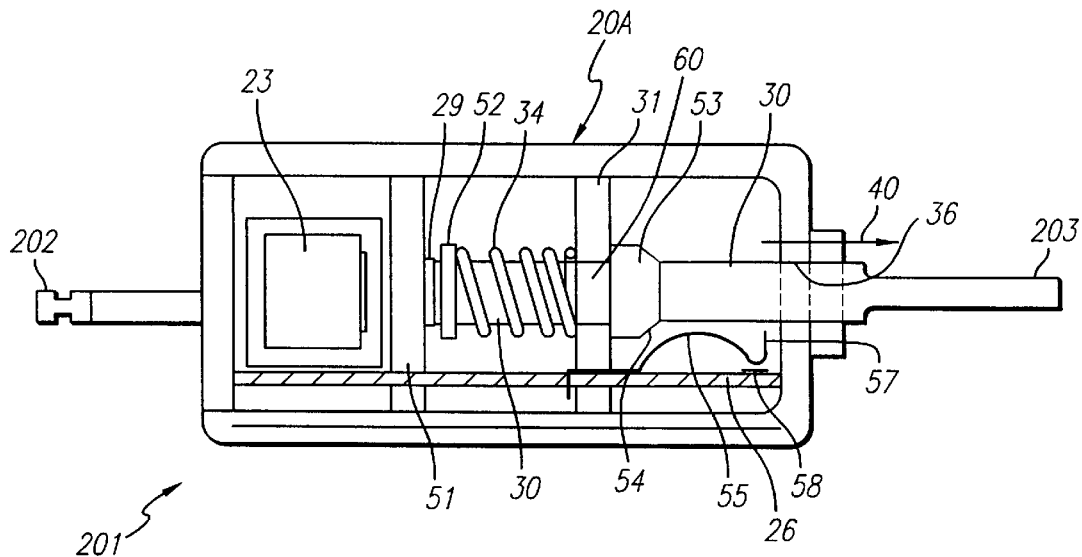
FIGS. 2B and 2C are orthogonal section views of another embodiment of the tension detecting element in FIG. 1A.
Figure 2C:
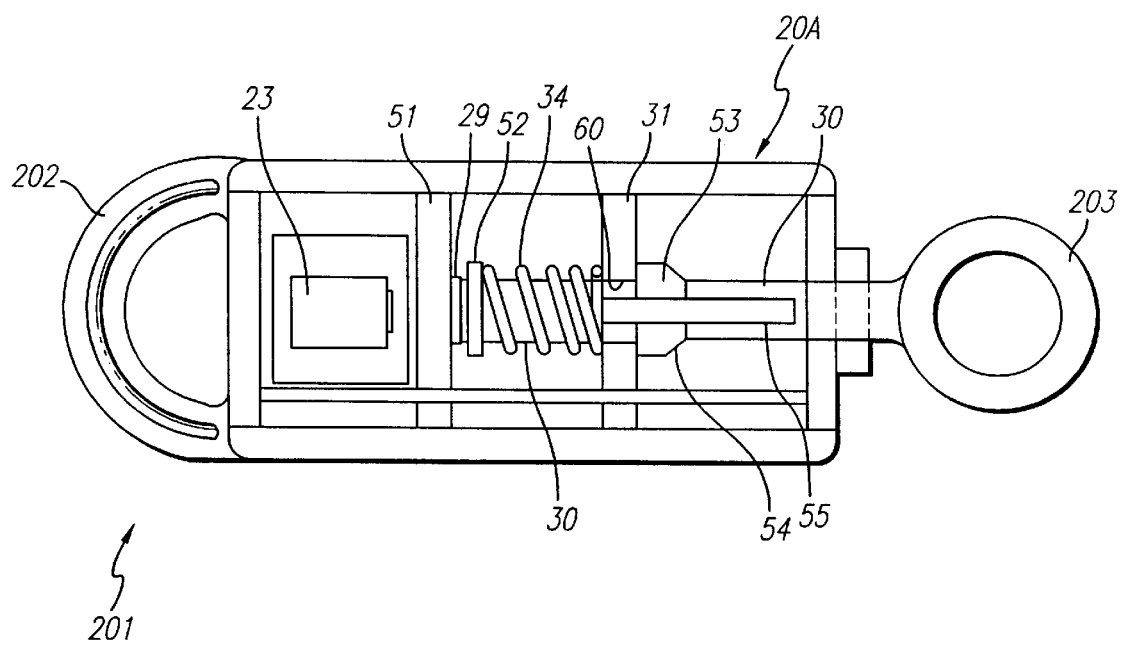
Figure 2D:
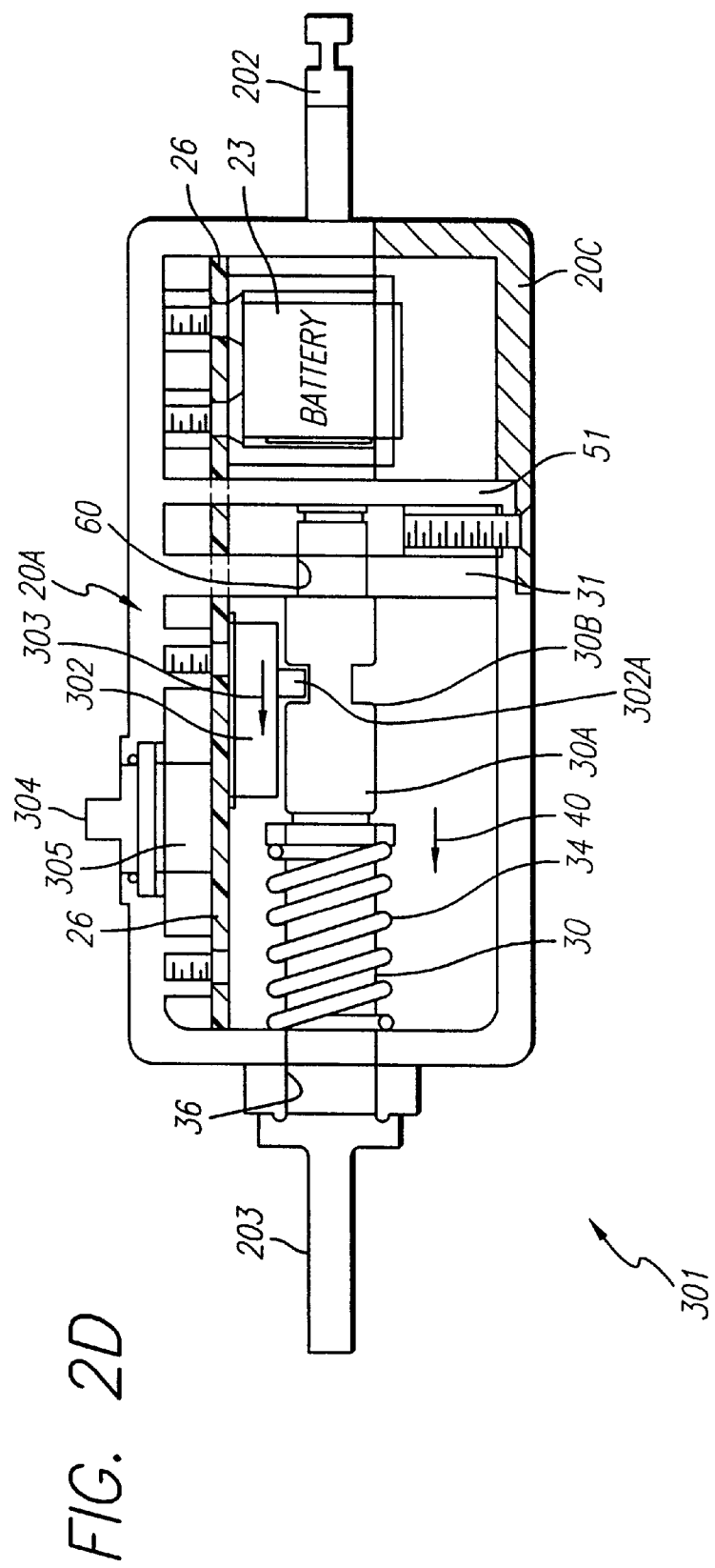
FIG. 2D is a section view of another embodiment of the tension detecting element in FIG. 1A.
Figure 2E:
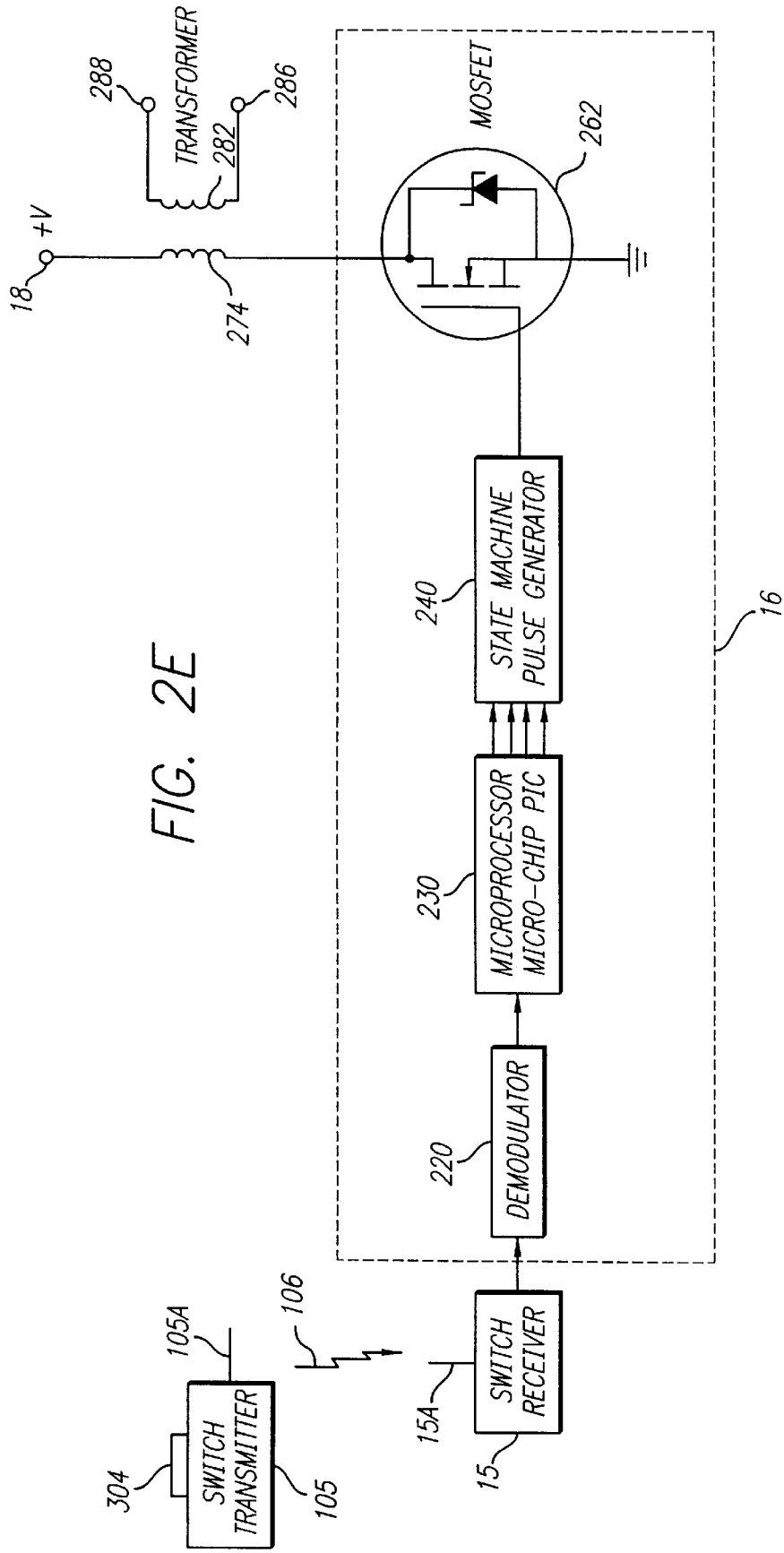
Figure 3:
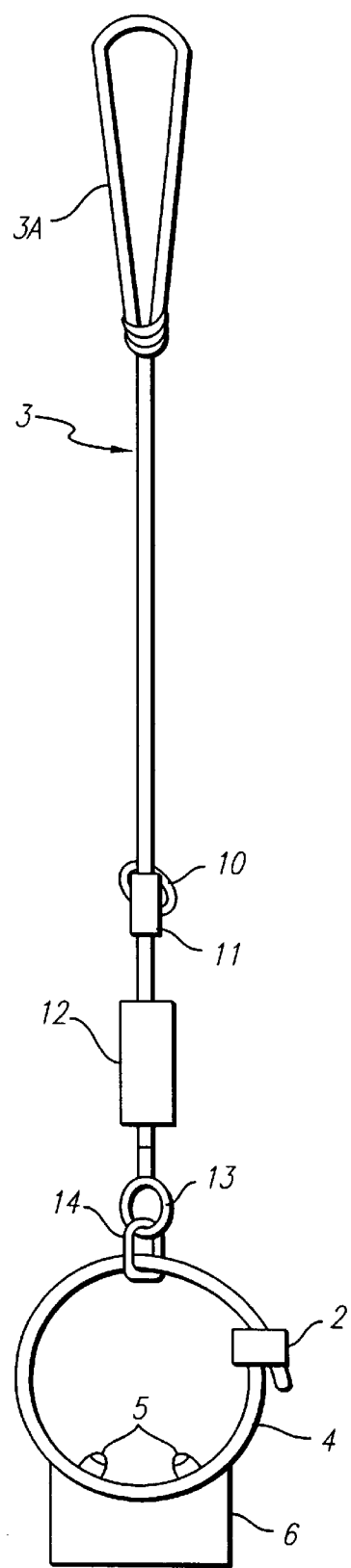
FIG. 3 is a diagram of another embodiment of the invention.

A conventional leash 3 (as shown in FIG. 3) is coupled to connecting ring 14 in FIG. 1A by means of a leash tension measurement coupler 101. Tension measurement coupler 101 includes a first connecting loop 102, to which one end of leash 3 is connected (as shown in FIG. 3). A second connector 103 is connected in moveable, spring-loaded relation to the main body of tension measurement coupler 101. A hook portion of connector 103 extends through connecting ring 14, as shown in FIG. 1A. A spring loaded clip 104 engages the hook and allows easy connection and removal of the leash 3 and tension measurement coupler 101 to or from collar loop 14. Tension measurement coupler 101 also includes a switch transmitter unit 105, shown both in FIGS. 1A and 12. The mechanical details of several embodiments of tension measurement coupler 101 are shown in FIGS. 2A–2F.

Referring to FIG. 2A, switch transmitter 105 of FIG. 1B is included on a printed circuit board 26 disposed within a plastic housing 20. Alignment pins 25 hold printed circuit board 26 in a desired location. One electrode of a button-type battery 23 is held in electrical contact with a corresponding conductor on the bottom surface of printed circuit board 26 by a battery cap 21 and a spring contact 24 which electrically connects the other electrode of battery 23 to printed circuit board 26. An O-ring 22 seals battery cap 21 to housing 20 to keep moisture out. Connector 103 is connected by a rotation coupler 107 to a moveable plastic shaft 30 which extends through a clearance hole 36 in the housing 20. A compression coil spring 34 is clamped between a bushing 37 which abuts the left inner wall of the cavity formed by housing 20 and a bushing 33 which is anchored to a right end portion of shaft 30. Another portion of shaft 30 extends through a clearance hole 32 to an integral foot 29 that engages the right inner wall of housing 20, which acts as a stop to limit the movement of shaft 30 to the right.

Thus, when connector 103 is moved to the left in the direction of arrow 40 relative to housing 20, shaft 30 also moves toward the left. A magnet 41 attached to shaft 30 also moves to the left. A reed relay 28 is attached to printed circuit board 26, so the magnet 41 moves into approximate alignment with reed relay 28 and actuates it. This occurs when spring 34 has been compressed by a predetermined amount of leash tension, which may be in the range of roughly 2 to 6 pounds.

Actuation of reed relay 28 turns switch transmitter 105 on, causing it to send RF signal 106 (FIG. 1B) to switch receiver 15, which in turn actuates stimulus circuit 16. That produces a predetermined stimulus voltage or a predetermined pattern of stimulus voltage pulses and/or levels between electrodes 5 which contact the skin of the dog being trained or controlled.

Stimulus circuitry 16 is included on a printed circuit board (not shown) within electrical stimulus unit 6. Switch receiver 15 and stimulus circuit 16 are mounted or formed on that printed circuit board. A conductive trace on that printed circuit board forms an antenna 15A of switch receiver 15 as shown in FIG. 1B. Similarly, a conductive trace on the printed circuit board on which transmitter circuit 105 is mounted acts as an antenna 105A from which the RF signal 106 is transmitted from switch transmitter 105 to switch receiver 15 contained in electric stimulus unit 6. Antennas 15A and 105A also could be implemented as discrete wire antennas or common ferrite antennas.

Compression spring 34 and magnet 41 and reed relay 28 are selected and arranged such that leash tension of roughly 2 to 6 pounds actuates reed relay 28 and causes switch transmitter 105 to transmit RF signal 106 to receiver switch 15. This avoids the need for a wire connection from coupler 101 to electrical stimulus unit 6.

The stimulus circuit 16 in electrical stimulus unit 6 can be of simple design, providing stimulation as indicated in any of the above-mentioned commonly assigned patents. Or, in another embodiment of the invention, a strain transducer could be provided which causes switch transmitter 105 to produce a signal indicative of the magnitude of over-tensioning of the leash by the animal being trained; the stimulus "program" produced by electric stimulus unit 6 increases as a function of the amount of over-tensioning, as indicated by line 50 on the graph of FIG. 6.

FIGS. 2B and 2C show orthogonal section views of another tension measurement coupler 201 similar to coupler 101 of FIG. 2A, except that the on/off switch consisting of reed relay 28 and magnet 41 in FIG. 2A is replaced by a spring conductor 55, a metal contact pad 58 on printed circuit board 26, and a moveable cam surface 54 to actuate the on/off switch. The left end of spring conductor 55 is anchored to the upper surface of printed circuit board 26, as shown in FIG. 2B. Plastic shaft 30 extends from leash/collar connection loop 203 through a clearance hole 36 in the right wall of housing 20A and a clearance hole 60 in a divider wall 31 as shown. A compression spring 34 is disposed between the left face of divider wall 31 and a retainer bushing 52 anchored to the left end of shaft 30. An enlarged shoulder 53 of shaft 30 located on the right side of divider wall 31 has a sloped cam surface 54 which engages spring conductor 55 as connection loop 203 and hence shaft 30 and cam surface 54 move in the direction of arrow 40 (FIG. 2B) in response to excessive leash tension. This depresses the right end of spring conductor 55, causing it to electrically contact conductive pad 58 on printed circuit board 26, actuating switch transmitter 105. Switch transmitter 105 then transmits signal 106 (FIG. 1A). Switch receiver 15 (FIG. 1B) receives signal 106 and actuates stimulus circuit 16, providing the desired stimulation to the dog.

FIG. 2D shows a section view of another, presently most preferred, embodiment of a tension measuring coupler 301. Housing 20A, shaft 30, compression spring 34, printed circuit board 26, and battery 23 of FIG. 2D are similar to those of the embodiments of FIGS. 2B and 2C. However, a different mechanical switch 302 is utilized, and a multi-position rotary switch 304,305 is mounted on the upper face of printed circuit board 26 and coupled to switch transmitter 105 (FIG. 2A), which also is mounted on printed circuit board 26 to vary the amplitude of the stimulation voltage pulses produced between electrodes 5. Switch 302 can be a Part Number EG1253 slide switch that is commercially available from E-Switch, Division of Electronic Components Groupe, Brooklyn Park, Minnesota. Rotary switch 305,304 can be a Part Number CD10R21SK ultra miniature DIP coded rotary switch, commercially available from C & K Components, Inc., of Watertowne, Mass. Battery 23 can be a ⅓N battery.

Switch 305 causes switch transmitter 105 to transmit an RF code to receiver circuit 15 (FIG. 1B), which decodes the amplitude information and applies the decoded signal to stimulus circuit 16. Switch 302 includes a slide button 302A that engages a circumferential groove 30B in an enlarged section 30A of shaft 30. Note that shaft 30 is rotatable relative to housing 20A.

FIGS. 2E and 2F show two embodiments of circuitry including rotary switch 304,305 and transmitter 105 to vary the amplitude of the stimulus voltage produced between electrodes 5.

Referring to FIG. 2E, a first circuit includes switch transmitter 105 including rotary switch 304,305 for selecting one of five desired electrode stimulus signal levels. The selected stimulus level is digitally encoded into an RF signal 106 that is transmitted by antenna 105A to a receiver 15, detected, and demodulated by a demodulator 220. Demodulator 220, a microprocessor 230, a state machine pulse generator 240, and a switch transistor 262 are included in receiver circuit 16. The demodulated stimulus code (which was selected by knob portion of rotary switch 304,305 of switch transmitter 105) then is utilized in microprocessor 230 to produce one of five possible stimulus level selection signals. The stimulus level selection signals produced by microprocessor 230 do not have pulse widths that correspond to the selected stimulus codes. Instead, all of the stimulus level selection signals have the same pulse width. The stimulus level selection signal produced by microprocessor 230 is applied to a pulse generator state machine 240 separate from microprocessor 230. State machine 240 (not microprocessor 230) operates on the constant-width stimulus level selection signals produced by microprocessor 230 to produce a drive signal consisting of drive pulses, the widths of which are determined by which of the five available stimulus level selection signal is applied to pulse generator circuit 240. The drive pulses are applied to the control electrode of the switch transistor 262 connected between ground and one terminal of primary winding 274 of the pulse transformer, the other terminal of which is coupled to power supply conductor 18 on which a supply voltage +V is applied. The peak-to-peak voltage produced between the electrodes connected to the secondary winding terminals of the pulse transformer corresponds to the pulse width of the drive pulses and hence to the selected stimulus level selected at the remote switch transmitter 105. Note that there is no one-to-one correspondence between widths of pulses output by microprocessor 230 and the peak-to-peak voltages of pulses between the secondary winding electrodes.

A second circuit is shown in FIG. 2F, wherein microprocessor 230 supplies a frequency-modulated stream of output pulses all of the same pulse width, just as in FIG. 2E. A filter including integrator 341 and operational amplifier 342 filters the frequency-modulated stream of constant width pulses to produce a drive signal in which the widths of the pulses correspond to the stimulus levels selected at switch transmitter 105. Again, as in FIG. 2E, there is no one-to-one correspondence between the width of pulses of the "first train" of pulses output by the microprocessor and the peak-to-peak electrode voltages of pulses of second train of pulses output by the transformer. The filter output signal is applied to control switch transistor 262.

Another embodiment of the invention shown in FIG. 3 uses any conventional leash 3 with a loop handle 3A. The opposite end of the leash 3 is connected by a suitable swivel connecter 10,11 to a spring loaded tension switch 12, the other end of which is coupled by a suitable connector 13 to a dog collar 4 having electrical stimulus electrodes 5 which are electrically connected to stimulus control circuitry in collar-supported stimulus unit 6. The stimulus control circuitry in stimulus unit 6 is electrically connected to a normally-open switch in spring-loaded tension switch 12. The spring loading is such that if the dog pulls with a force greater on leash 3 than a predetermined amount (e.g., 2 to 6 pounds), the switch in spring-loaded tension switch 12 actuates the stimulus control circuitry in housing 6 by a pair of conductors (not shown) that extend from tension measuring switch 12 to stimulus circuit 6. The stimulus control circuitry can be designed to continue the stimulus at a constant level or a programmed increasing level determined by how long the dog maintains enough tension on the leash to exceed the switch threshold. Stimulation pulse amplitude, frequency, and/or duration also could be controlled by circuitry in loop handle 3A.

Figure 4:
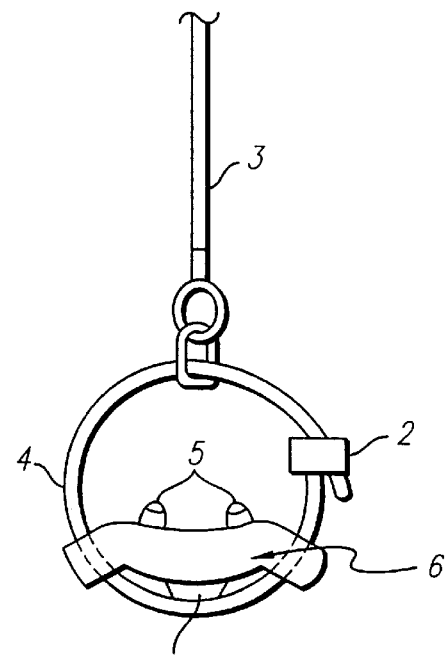
FIG. 4 is a diagram of another embodiment of the invention.

FIG. 4 shows another embodiment of the invention in which a conventional leash 3 is attached in a conventional manner to dog collar 4. In this embodiment, however, the collar strap passes through openings in the housing of stimulus unit 6 and around a depressible switch 7A. If the dog pulls hard against leash 3, the resulting tension of the bottom portion of the collar against depressible switch 7A actuates it and activates stimulus control circuitry to produce the desired aversive electrical voltage between electrodes 5.

Figure 5:
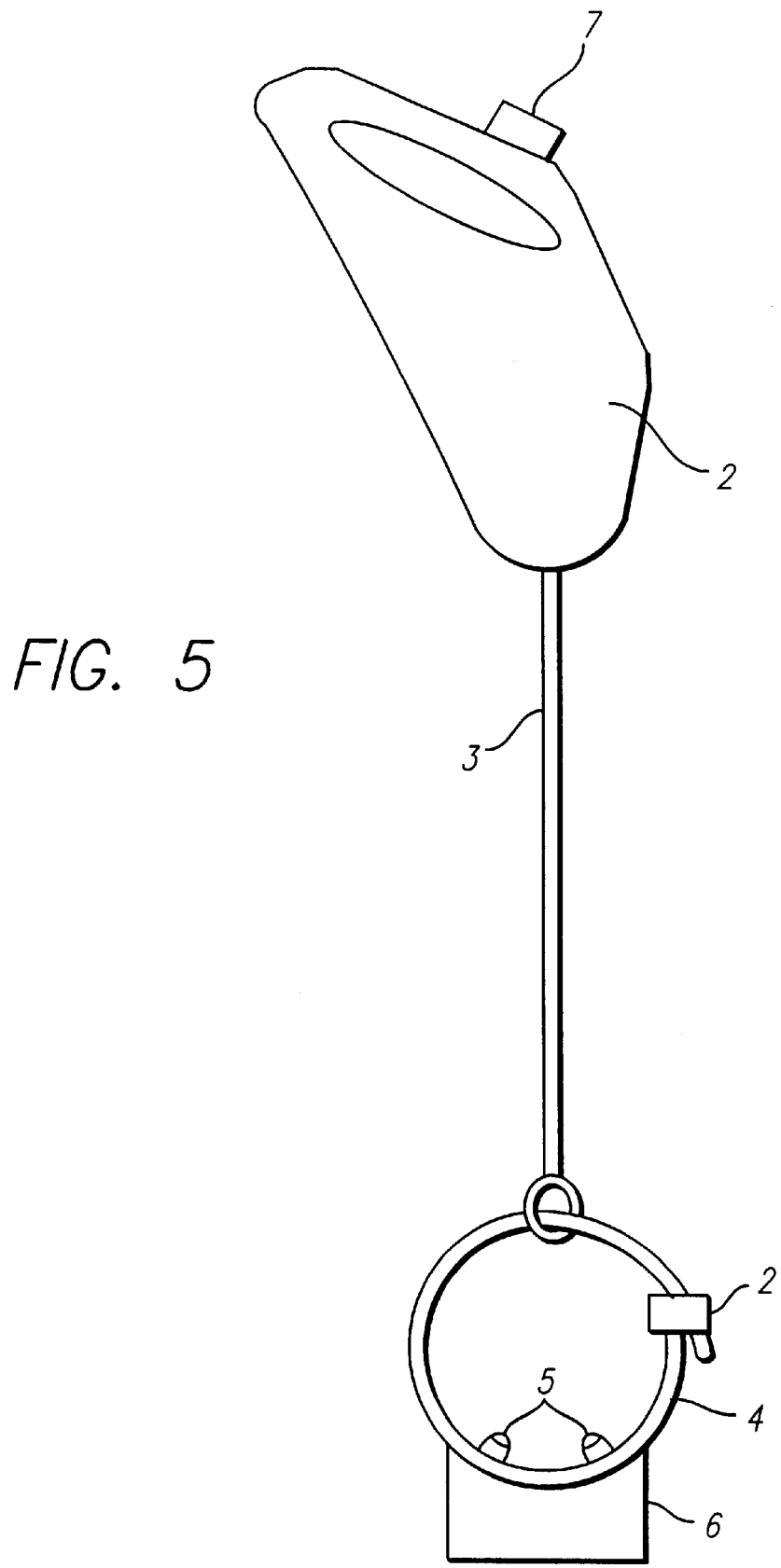
FIG. 5 is a diagram of another embodiment of the invention using a handle-mounted control to initiate stimulus between the electrodes of a collar-mounted stimulus device.

FIG. 5 shows another embodiment of the invention in which a dog collar 4 carries stimulus unit 6. In response to a control signal produced by depressing button 7 on handle 2, the stimulus control circuitry in stimulus unit 6 generates an aversive electrical stimulus voltage between electrodes 5, which contact and apply aversive stimulus to the skin of the dog's neck. Either a wire or wireless connection could be provided between a switch actuated by button 7 and stimulus unit 6. The person walking the dog simply holds handle 2 by means of the illustrated grip, with his or her fingers extending through the finger hole. If the dog pulls too hard on leash 3, the person may speak a stern verbal command ordering to the dog to "back off". If the dog does not immediately obey, the owner may depress button 7 on handle 2 to activate electrical stimulus via electrodes 5. As an alternative, the stimulus control circuitry could be located in handle 2 instead of collar mounted housing 6 and connected by conductors in leash 3 to electrodes 5. As another alternative, the tension measurement device can be located in handle 2, and can include the previously described switch transmitter circuit to generate the control signal as an RF wireless signal in response to measurement of the tension in the tension measurement device.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention. For example, a mechanism could be provided to manually adjust the amount of leash tension required to actuate switch transmitter 105, for example, by adjusting the position of switch 302,302A relative to circumferential groove 30B and shaft 30. The rotary switch 304,305 could also adjust the numbers, frequencies, and/or durations of stimulus voltage pulses, as well as the amplitudes thereof. In addition to electrical stimulus as described above, sound stimulation by means of a sound transducer in stimulus unit 6 could be controlled in essentially the same manner.

What is claimed is:

1. A leash training device comprising:
   (a) a leash cord, and a handle attached to a first end of the leash cord;
   (b) a stimulus collar coupled to a second end of the leash cord, the stimulus collar including
      i. a strap adapted to fit around the neck of an animal to be trained or controlled,
      ii. an electrical stimulus unit supported by the strap, the electrical stimulus unit including a stimulus circuit, and a transformer coupled between the stimulus circuit and a pair of electrodes for contacting skin of the animal, and
      iii. a switch receiver circuit; and
   (c) a tension measurement device coupled to the leash cord for measuring tension in the leash cord and producing a control signal when the tension exceeds a predetermined threshold, the stimulus circuit producing a drive signal in response to the control signal and applying the drive signal to a primary winding of the transformer, the tension measurement device including a switch transmitter which generates the control signal as a wireless signal in response to movement of a first connector relative to a second connector sufficient to cause the tension to exceed the predetermined threshold.

2. The leash training device of claim 1 wherein the strap includes a collar connector, and the first connector is connected to the collar connector and the second connector is connected to the second end of the leash cord.

3. The leash training device of claim 2 wherein the tension measurement device includes a spring having a moveable first end connected to the first connector and a second end coupled in a fixed relationship to the second connector, the tension measurement device also including a switch device operable in response to movement of the first connector relative to the second connector, the spring resisting movement of the second connector relative to the first connector.

4. The leash training device of claim 3 wherein the spring is a compression spring.

5. The leash training device of claim 3 wherein the tension measurement device produces the control signal of a first predetermined duration if the tension exceeds the predetermined threshold for longer than a second predetermined duration.

6. The leash training device of claim 1 wherein the switch transmitter circuit includes a stimulus amplitude selector switch operable to select one of a plurality of stimulus amplitudes and transmits the control signal to have a value representative of the selected stimulus amplitude, and the switch receiver circuit decodes the value of the control signal and in response thereto produces the drive signal with pulses of durations corresponding to the value of the control signal.

7. The leash training device of claim 1 wherein the tension measurement device includes a strain transducer adapted to produce a value of the control signal representative of the amount of tension in the leash, the stimulus circuit producing the drive signal to produce a stimulus signal between the electrodes having an intensity generally proportional to the amount of tension.

8. The leash training device of claim 1 wherein the tension measurement device is in the handle.

9. A method of applying a predetermined stimulus signal to train an animal, comprising:
   (a) providing
      i. a leash cord, and a handle attached to a first end of the leash cord,
      ii. a stimulus collar coupled to a second end of the leash cord, the stimulus collar including a strap adapted to fit around the neck of an animal to be trained or controlled, and an electrical stimulus unit supported by the strap, the electrical stimulus unit including a stimulus circuit, and a transformer coupled between the stimulus circuit and a pair of electrodes for contracting skin of the animal, wherein the stimulus collar includes a switch receiver circuit;

(b) automatically producing a control signal indicative of the amount of tension in the leash cord by means of a tension measurement device coupled to the leash cord, wherein the tension measurement device includes a switch transmitter which generates the control signal as a wireless signal in response to movement of a first connector relative to a second connector sufficient to cause the tension to exceed a predetermined threshold;

(c) applying the control signal to the stimulus circuit and causing the stimulus circuit to produce a drive signal; and d) applying the drive signal to a primary winding of the transformer.

* * * * *